(12) United States Patent
Kish et al.

(10) Patent No.: US 7,185,894 B2
(45) Date of Patent: Mar. 6, 2007

(54) WATERTIGHT CORRUGATED PIPE GASKET

(75) Inventors: Kevin S. Kish, Hilliard, OH (US); Pardeep K. Sharma, Brampton (CA)

(73) Assignee: Advanced Drainage Systems, Inc., Hilliard, OH (US)

(*) Notice: Subject to any disclaimer, the term of this patent is extended or adjusted under 35 U.S.C. 154(b) by 0 days.

(21) Appl. No.: 10/864,733

(22) Filed: Jun. 9, 2004

(65) Prior Publication Data

US 2005/0275169 A1    Dec. 15, 2005

(51) Int. Cl.
*F16L 21/02* (2006.01)
*F16L 17/00* (2006.01)

(52) U.S. Cl. ............... 277/616; 277/607; 277/626; 277/627

(58) Field of Classification Search ............ 277/602, 277/604, 607, 608, 616, 626, 627
See application file for complete search history.

(56) References Cited

U.S. PATENT DOCUMENTS

| | | | |
|---|---|---|---|
| 2,882,073 A | 4/1959 | James | |
| 3,493,237 A | 2/1970 | Kleindienst | |
| 3,573,871 A | 4/1971 | Warner | |
| 3,857,589 A | 12/1974 | Oostenbrink | |
| 4,223,895 A | 9/1980 | Roberts, Jr. et al. | |
| 4,298,206 A * | 11/1981 | Kojima | 277/626 |
| 4,437,691 A * | 3/1984 | Laney | 285/353 |
| 4,458,904 A | 7/1984 | Delhaes | |
| 4,702,502 A * | 10/1987 | Shade et al. | 285/231 |
| 4,818,209 A * | 4/1989 | Petersson et al. | 425/392 |
| 4,850,602 A * | 7/1989 | Goldstein et al. | 277/556 |
| 4,946,206 A | 8/1990 | Roe et al. | |
| 5,305,903 A | 4/1994 | Harde | |
| 5,324,083 A | 6/1994 | Vogelsang | |
| 5,415,436 A | 5/1995 | Claes et al. | |
| 5,988,695 A * | 11/1999 | Corbett, Jr. | 285/110 |
| 6,082,741 A | 7/2000 | Gregoire et al. | |
| 6,170,883 B1 * | 1/2001 | Mattsson et al. | 285/110 |
| 6,336,640 B1 * | 1/2002 | Knapp | 277/606 |
| 6,367,802 B1 * | 4/2002 | Knapp | 277/314 |
| 6,623,013 B1 * | 9/2003 | Lee | 277/628 |
| 6,948,718 B2 * | 9/2005 | Shaffer et al. | 277/626 |
| 2002/0153668 A1 * | 10/2002 | Deeb et al. | 277/606 |
| 2005/0161947 A1 * | 7/2005 | Skinner et al. | 285/374 |

* cited by examiner

*Primary Examiner*—Alison K Pickard
(74) *Attorney, Agent, or Firm*—Kremblas, Foster, Phillips & Pollick; Patrick P. Phillips

(57) ABSTRACT

A corrugated pipe saddle gasket is provided having a leading member, a primary sealing member, and an arm member, with the gasket having a contoured surface extending along at least a portion of the bottom of the primary sealing member and the arm member corresponding to the shape of a corrugated pipe. The primary sealing member of a second length is intermediate the leading member of a first length and the arm member of a third length, with the third length being greater than the sum of the first and second lengths. The gasket has at least a portion of its arm member having a durometer different from the durometer of the primary sealing member. In the preferred embodiment, the arm member has an axis that is substantially horizontal, and the leading member has an axis that is substantially vertical, such that the two axes are substantially perpendicular. The primary sealing member has a beveled portion, a sloping portion, and an end wall, with the sloping portion being between the beveled portion and the end wall. The leading member has a bottom surface, a channel, and a leading face having top and bottom edges.

14 Claims, 2 Drawing Sheets

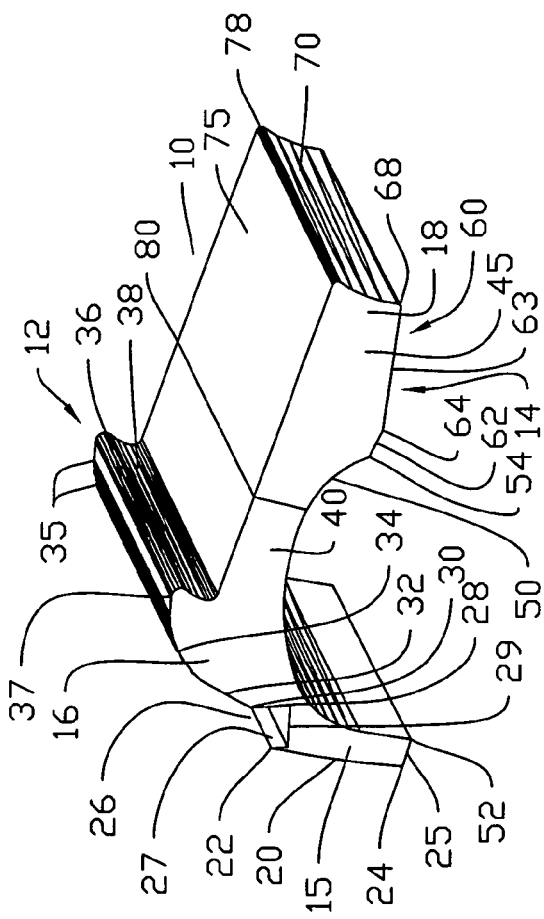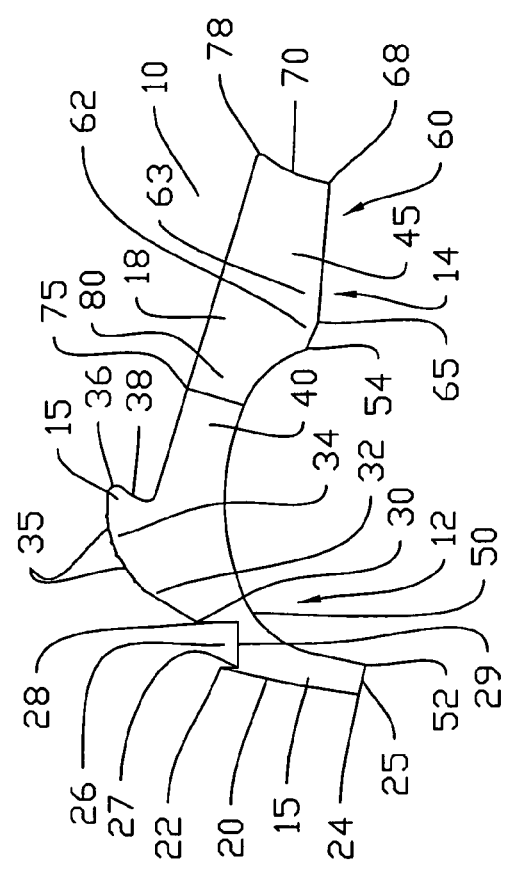
FIG 1
FIG 2

WATERTIGHT CORRUGATED PIPE GASKET

BACKGROUND OF THE INVENTION

1. Field of the Invention

This invention relates generally to pipe gaskets, and more particularly, to such gaskets that are used with corrugated pipe, and even more particularly to such gaskets that are also watertight.

2. Description of the Related Art

This invention is directed to the providing of a gasket for use with corrugated pipe. Preferably the type of pipe is plastic, and the dimension of the pipe is 12" and above. Gaskets for pipe are well known in the art. Gaskets for pipe include James, U.S. Pat. No. 2,882,073, for a gasket used with concrete pipe, and Kleindienst, U.S. Pat. No. 3,493,237, for pipes preferably made of a ceramic material. In both of those patents, a grout is used to effectuate the ultimate seal desired to be obtained. The use of a grout is made possible by the composition of the pipe.

A gasket for a bell and spigot pipe connection for use with a smooth wall pipe is disclosed in Warner, U.S. Pat. No. 3,573,871; Roberts et al, U.S. Pat. No. 4,223,895; and Vogelsang, U.S. Pat. No. 5,324,083. A bi-directional corrugated pipe-rib seal for use with elastomeric pipe is disclosed in Roe et al, U.S. Pat. No. 4,946,206, and a high pressure coupling for corrugated plastic pipe and conduit is disclosed in Claes et al, U.S. Pat. No. 5,415,436.

Even with the evolution of gaskets, a problem arose as technology made it possible to fabricate plastic pipes of a larger diameter. As technology allowed pipes to be made having large diameters, especially those having a diameter of 40" and above, gasket design kept pace only where the pipes had to keep dirt out of connected pipes. However, in the case of corrugated pipe gaskets, a unique problem presented itself with the larger pipe where the joined pipes were supposed to be watertight, and more particularly where the joining of the pipes occurred on site through the making of field cuts or repairs.

A resilient pipe gasket marketed as the first watertight gasket for use with large diameter corrugated plastic pipe is Gregoire et al, U.S. Pat. No. 6,082,741. While resilient gaskets had been made for use with corrugated pipe having a relatively small diameter, the amount of rubber used in the gasket was proportional to the height of the corrugations. In smaller diameter pipe, the amount of rubber in a gasket that arguably resulted in a watertight gasket seal still made for a gasket which could be stretched over a pipe spigot without too much trouble. However, as pipe diameter increased, especially when the diameter exceeded 40", gaskets became too stiff, plus the amount of material in these gaskets made it difficult to install on pipe. Consequently, the ability to effectively provide for a watertight seal was adversely impacted.

For example, attempts were made to provide a concrete collar with plastic bell and spigot joined pipe. Of course, this approach entailed additional time and costs where the installation occurred in the field. Additionally, concrete does not typically adhere well to plastic, so there was always the possibility for leakage. An alternative approach was to try to utilize a conventional type of gasket, such as a valley gasket. However, for pipe having larger diameters, the rubber gasket itself could not be easily stretched onto the pipe and would typically require several people to physically install. Realistically, this theoretical solution was not practical. Another alternative has been to join two spigots ends of pipe together. Then a bell-bell coupling and gasket is used, however, a watertight seal can only be obtained if a gasket existed to seal the bell-bell coupling, and such a gasket only currently exists for use with smaller diameter pipe.

It is thus apparent that the need exists for a watertight pipe gasket which effectuates a watertight seal in field cuts of corrugated pipe, especially when the pipe is of a larger diameter, and which gasket is relatively easy and cost effective to use.

SUMMARY OF THE INVENTION

In accordance with the present invention, there is disclosed a corrugated pipe saddle gasket having a leading member, a primary sealing member, and an arm member, with the gasket having a contoured surface extending along at least a portion of the bottom of the primary sealing member and the arm member. The primary sealing member being intermediate the leading member and the arm member. The leading member is of a first length, the primary sealing member is of a second length, and the arm member is of a third length, with the third length being greater than the sum of the first and second lengths. The contoured surface has the contour corresponding to a portion of the external surface of the corrugation of a corrugated pipe.

At least a portion of the arm member has a durometer different from the durometer of the primary sealing member. The primary sealing member has a beveled portion, a sloping portion, and an end wall, with the sloping portion being intermediate the beveled portion and the end wall, and with the beveled portion being intermediate the sloping portion and the channel. The arm member has a top surface, a bottom surface, and a leading face, with the leading face extending between the arm member top surface and the arm member bottom surface. The arm member has a hinge formed therein. A first portion of the arm member is of a first durometer, and a second portion of the arm member is of a second durometer, with the first durometer being less than the second durometer.

The leading member has a channel formed therein, a leading face having a top edge and a bottom edge, and a bottom surface. The channel has a first sidewall, a second sidewall, and a bottom surface, with the first sidewall being adjacent the leading face and the channel having a width that extends from the first sidewall to the second sidewall. The first sidewall has a height that extends from the top edge of the leading face to the channel, and the width of the channel is greater that the height of the first sidewall. The leading member has an axis that is substantially vertical, and the arm member has an axis which is substantially horizontal, such that the two axes are substantially perpendicular to each other.

There is also disclosed a corrugated pipe saddle gasket having a leading member, a primary sealing member, and an arm member, with the gasket having a contoured surface extending along at least a portion of the bottom of the primary sealing member and the arm member, with the leading member having a bottom surface, a channel, and a leading face having a top edge and a bottom edge, with the channel having a first sidewall, a second sidewall and a bottom surface, with the first sidewall being adjacent the leading face, and with the channel having a width that extends from the first sidewall to the second sidewall, and with the first sidewall having a height that extends from the top edge of the leading face to the channel, and with the width of the channel being greater than the height of the first sidewall.

The arm member has a first portion of a first durometer and a second portion of a second durometer, with the first durometer being less than the second durometer. The leading member has an axis which is substantially vertical, and the arm member has an axis which is substantially horizontal, such that the leading member axis is substantially perpendicular to the arm member axis.

There is also disclosed the combination of a first corrugated pipe having an external surface, a second corrugated pipe having a bell, and a corrugated pipe saddle gasket having a leading member, an arm member, and a primary sealing member. In the preferred embodiment of the invention, the first corrugated pipe and the second corrugated pipe are double walled. The gasket has a contoured surface extending along at least a portion of the bottom of the primary sealing member and the arm member, with the contoured surface contacting the external surface of the first corrugated pipe. The primary sealing member has an upper surface contacting the bell. At least a portion of the arm member has a durometer different from the durometer of the primary sealing member and the leading member.

The arm member has a top surface, a bottom surface, and a leading face, with the leading face extending between the arm member top surface and the arm member bottom surface, and with the first corrugated pipe having a first corrugation and a second corrugation, with the contoured surface contacting the first corrugation and the leading face being directly adjacent the second corrugation.

There is also disclosed a corrugated pipe saddle gasket having a first portion and a second portion, with the first portion having a first durometer, and with the second portion having a second durometer, the first portion including a leading member a primary sealing member and a portion of an arm member, and the second portion including a portion of the arm member, with at least a portion of the arm member having a durometer different from the durometer of the primary sealing member and the leading member. In the preferred embodiment of the invention, the primary sealing member and the leading member have the same durometer. The arm member has a top surface, a bottom surface, and a leading face, with the leading face extending between the arm member top surface and the arm member bottom surface. The first durometer is less than the second durometer. The leading member is of a first length, the primary sealing member is of a second length and the arm member is of a third length, with the third length being greater than the sum of the first and second lengths.

The primary objective of this invention is to provide a watertight pipe gasket. It would even be more desirable if the gasket also would provide a watertight seal with corrugated pipe, especially pipe of a larger diameter such as 40" and above.

Another objective of this invention is to provide such a gasket that will not be blown out from a joint under watertight applications.

Yet another objective of this invention is to provide a gasket that will not be displaced during joining of two section of pipe together. An important aspect of this objective is the dimensioning associated with the arm member that effectively locks the gasket in place.

Another objective of this invention is to provide such a device which is relatively easy to install in its operative position.

Still another objective of this invention is to provide a watertight gasket for pipe and fittings, which gasket can be installed where field cuts are used, and where an offset is desired in the joint for curvilinear applications.

Other objects and advantages of the invention will be apparent from the following description, the accompanying drawings and the appended claims.

BRIEF DESCRIPTION OF THE DRAWINGS

FIG. 1 is a perspective view of a watertight corrugated pipe gasket made in accordance with the present invention, but shown in part as a vertical sectional view.

FIG. 2 is a front elevational view taken of the vertical sectional view of FIG. 1.

Figures 3, 4:
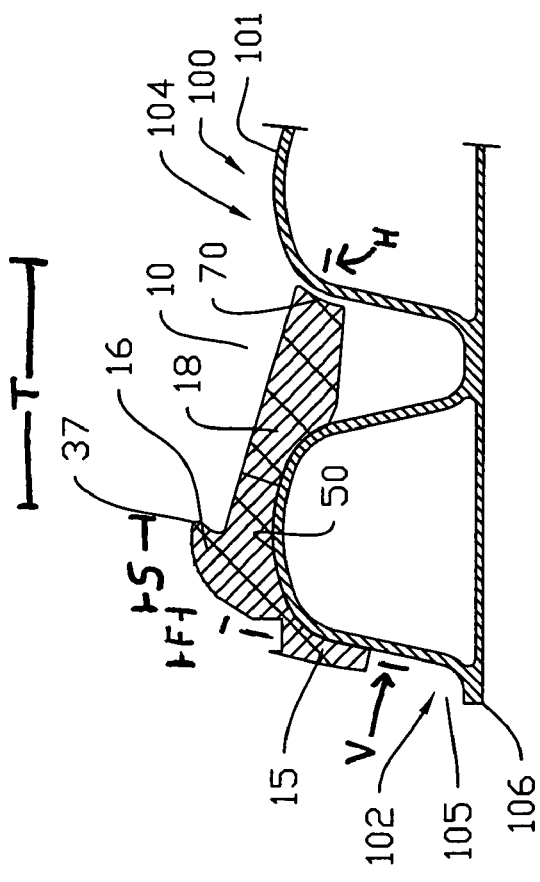
FIG. 3 is a vertical sectional view of the invention as shown in FIG. 2 when installed on a corrugated pipe.
FIG. 4 is a vertical sectional view of the invention when installed in actual use.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1, which discloses a saddle gasket for corrugated pipe made in accordance with the invention designated generally by the numeral 10. The gasket can be fabricated from a variety of materials known in the manufacture of gaskets, such as rubber, EPDM, nitrile, thermoplastic elastomers (TPE), and isoprene or a combination thereof. The gasket 10 has a first portion 12 and a second portion 14. The first portion 12 has a first durometer, and the second portion 14 has a second durometer, with the first and second durometers being different. Preferably, the first durometer is less than the second durometer.

As can be appreciated from a comparison of FIGS. 1 and 2, the gasket 10 includes a leading member 15, a primary sealing member 16, and an arm member 18. The leading member 15, the primary sealing member 16, and at least a portion of the arm member 18 comprise the first portion 12 of the gasket 10. Meanwhile, the remaining portion of the arm member comprises the second portion 14 of the gasket 10.

The leading member 15 has a leading face 20, with this face being substantially planar. The leading member leading face 20 has a top edge 22 as well as a bottom edge 24. Directly adjacent to the leading face 20 of the leading member 15 at the bottom edge 24 is the leading member bottom surface 25.

Meanwhile, adjacent the leading member leading face 20 at the top edge 22 is a channel 26. As can be appreciated from a comparison of FIGS. 1–4, the channel 26 has a first sidewall 27 that terminates in the top edge 22, a second sidewall 28, and a channel bottom surface 29. The channel bottom surface 29 is intermediate the first sidewall 27 and the second sidewall 28. Similarly, the second sidewall 28 is intermediate the channel bottom surface 29 and the primary sealing member first end 30. Preferably, both the first sidewall 27 and second sidewall 28 of the channel 26 are planar. In actual use, the channel can be used to accommodate a sealing band of the type that is sometimes used in conjunction with gaskets. However, it should be understood that preferably a sealing band is not used.

Consideration of the structure of the primary sealing member 16 discloses that in the preferred embodiment of the invention, directly adjacent the primary sealing member first end 30 is a beveled portion 32. This beveled portion 32 slopes upwardly from the primary sealing member first end 30 in a direction towards the sloping portion 34 of the primary sealing member. The sloping portion 34 is shown having a plurality of ribs 35, six ribs being what is shown in the drawings, although their inclusion in the gasket is optional. The ribs 35 extend upwardly from the primary sealing member upper surface 37. The primary sealing member 16 also has a second end 36 at the end of the upper surface 37 opposite the primary sealing member first end 30.

Extending downwardly from the primary sealing member upper surface 37 at the second end 36 is a primary sealing member end wall 38. The primary sealing member end wall 38 extends to the arm member 18. The arm member 18 has an arm member first portion 40 and an arm member second portion 45, shown as being connected to one another.

A contoured surface 50 extends along the bottom of the gasket 10, with this contoured surface having a first edge 52 and a second edge 54, and with the contoured surface being concave. The contoured surface first edge 52 is at the juncture of the bottom surface 25 and the contoured surface. The contoured surface second edge 54 is at the juncture of the contoured surface 25 and the arm member bottom surface 60. The arm member bottom surface 60 has an arm member bottom surface first portion 62 and an arm member bottom surface second portion 63. Both the first and second portions 61 and 62 respectively of the arm member bottom surface 60 are preferably planar and intersect at an intermediate edge 65. The first portion 65 extends between the second portion and the contoured surface, such that the first portion's ends are the contoured surface's second edge 54 and the intermediate edge 65.

The arm member bottom surface 60 also has a terminal edge 68 at the opposite end of the second portion 63 from the intermediate edge 65. The terminal edge 68 is preferably rounded and extending upwardly therefrom is a terminal face 70, which is preferably also slightly concave. The arm member 18 also has a top surface 75 having an arm member top surface terminal edge 78. This terminal edge 78 is preferably rounded and extending downwardly therefrom is the aforementioned terminal face 70. The top surface 75 has a hinge 80 effectively formed at the juncture line where the arm member first portion 40 and arm member second portion 45 meet. The leading member is shown as being of a first length F, the primary sealing member as being of a second length S, and the arm member as being of a third length T, with the third length being greater than the sum of the first and second lengths. The leading member has a substantially vertical axis V, and the arm member has a substantially horizontal axis H, with the two axes being substantially perpendicular to one another.

A comparison of FIGS. 3 and 4 shows how the gasket of this invention is actually used to effect a watertight seal on a corrugated pipe 100. The corrugated pipe 100 has an exterior surface 101, a first corrugation 102 and a second corrugation 104. The first corrugation 102 is the end corrugation on a first pipe 105, such that the first pipe end 106 is in a portion of valley 111 in the pipe directly adjacent the first corrugation 102.

The gasket 10 is stretched or rolled over the first corrugation 102 until the contoured surface 50 rests on the exterior surface 101 of the first corrugation atop the crown of the corrugation. The arm member extends over the valley 111 between the first and second corrugations 102 and 104 respectively. The terminal face 70 can either be in contact with the exterior surface of the second corrugation or spaced a slight distance away from the exterior surface 101. The contoured surface is fabricated such that it corresponds to the shape of the exterior surface of the corrugations on the pipe.

Once the gasket is in place on the first pipe 105, a second pipe 107 has its bell end 108 slid over the spigot end of the first pipe. The bell 108 is welded, or otherwise fixedly secured, to the second pipe 107 at weld spots 109. As the second pipe is slid over the first pipe, the inner wall 110 of the bell compresses the primary sealing member of the gasket against the corrugation, thereby effecting a watertight seal where the primary sealing member and inner wall are in contact.

The first portion of the arm member is of a lower durometer than the second portion of the arm member. For example, a watertight seal has been formed where the first portion has a durometer of 50 and the second portion has a durometer of 75, although a combination of other durometers could be used. In another embodiment of the invention, the gasket is of a single durometer that results in a gasket soft enough to install on a pipe, yet at the same time have an arm member second portion of a length that precludes movement of the gasket thereby effectively locking the gasket in its desired position. The relatively soft first portion makes it easier to get over corrugations, especially those associated with large diameter corrugated pipe. The relatively soft portion also makes it easier to form a watertight seal as a result of the compression of the gasket. Similarly, the relatively higher durometer associated with the second portion permits the arm member second portion 45 to preclude movement of the gasket completely over the first corrugation, thereby effectively locking the gasket in its desired position.

According to current ASTM D 1417, in order for a seal to be watertight it must be able to withstand an air pressure of 3.5 p.s.i. (pounds per square inch) to satisfy the field test standard, and according to current ASTM D 3212 a water pressure of 10.8 p.s.i. to satisfy the lab test standard. The gasket of this invention has been able to remain watertight when subjected to those pressures listed above or higher.

The dual durometer gasket of this invention allows for sealing and locking functions to occur during insertion of the first pipe bell end over the second pipe spigot end containing the gasket. The compression and displacement of the elastomeric seal against the inner wall of the bell thus provides a watertight barrier for infiltration or exfiltration of water at the pipe joint. The sloping face of the leading member decreases insertion forces and reduces the movement of the gasket during insertion. The resistance to bending as a result of the higher durometer arm member second portion keeps the gasket positioned on the desired corrugation during high internal pipe pressures. The presence of the hinge in the center of the gasket allows for additional material compression when there is increased upward water force on the gasket. The gasket could be field or plant installed. It has been found that the gasket of this invention permits a watertight seal to be attained with pipe, especially double-walled pipe having an inner diameter of 42–60".

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A corrugated pipe saddle gasket comprising
a leading member,
a primary sealing member, and
an arm member, said gasket having a contoured surface extending along at least a portion of the bottom of said primary sealing member and said arm member, said primary sealing member being intermediate said leading member and said arm member, said leading member being of a first length, said primary sealing member being of a second length, said arm member being of a third length, said third length being greater than the sum of said first and second lengths, said leading member having a leading face, said leading face having a top edge and a bottom edge, said leading member having a bottom surface and a channel, said channel having a first sidewall, a second sidewall, and a bottom surface, said first sidewall being adjacent said leading face, said channel having a width that extends from said first sidewall to said second sidewall, said first sidewall having a height that extends from said top edge of said leading face to said channel, said width of said channel being greater than said height of said first sidewall, at least a portion of said arm member having a durometer different from the durometer of said primary sealing member.

2. The gasket according to claim 1 wherein said arm member has a top surface, a bottom surface, and a leading face, said leading face extending between said arm member top surface and said arm member bottom surface.

3. The gasket according to claim 1 wherein said primary sealing member has a beveled portion, a sloping portion, and an end wall, said sloping portion being intermediate said beveled portion and said end wall.

4. The gasket according to claim 1 wherein said arm member has a first portion and a second portion, said first portion being of a first durometer and said second portion being of a second durometer, said first durometer being less than said second durometer.

5. The gasket according to claim 1 wherein said contoured surface has the contour corresponding to a portion of the external surface of the corrugation of a corrugated pipe.

6. The gasket according to claim 1 wherein said leading member has an axis which is substantially vertical and said arm member has an axis that is substantially horizontal, said leading member axis being substantially perpendicular to said arm member axis.

7. A corrugated pipe saddle gasket comprising
a leading member,
a primary sealing member, and
an arm member, said gasket having a contoured surface extending along at least a portion of the bottom of said primary sealing member and said arm member, said leading member having a leading face, said leading face having a top edge and a bottom edge, said leading member having a bottom surface and a channel, said channel having a first sidewall, a second sidewall, and a bottom surface, said first sidewall being adjacent said leading face, said channel having a width that extends from said first sidewall to said second sidewall, said first sidewall having a height that extends from said top edge of said leading face to said channel, said width of said channel being greater than said height of said first sidewall, said leading member having an axis which is substantially vertical and said arm member having an axis that is substantially horizontal, said leading member axis being substantially perpendicular to said arm member axis.

8. The gasket according to claim 7 wherein said arm member has a first portion and a second portion, said first portion being of a first durometer and said second portion being of a second durometer, said first durometer being less than said second durometer.

9. The gasket according to claim 7 wherein said arm member has a hinge formed therein.

10. A corrugated pipe saddle gasket comprising
a leading member, said leading member having a channel formed therein,
a primary sealing member, said primary sealing member having a beveled portion, a sloping portion, and an end wall, said sloping portion being intermediate said beveled portion and said end wall, said beveled portion being intermediate said sloping portion and said channel, and
an arm member, said gasket having a contoured surface extending along at least a portion of the bottom of said primary sealing member and said arm member, said primary sealing member being intermediate said leading member and said arm member, said leading member being of a first length, said primary sealing member being of a second length, said arm member being of a third length, said third length being greater than the sum of said first and second lengths.

11. The gasket according to claim 10 wherein at least a portion of said arm member has a durometer different from the durometer of said primary sealing member.

12. The gasket according to claim 10 wherein said arm member has a top surface, a bottom surface, and a leading face, said leading face extending between said arm member top surface and said arm member bottom surface.

13. The gasket according to claim 10 wherein said arm member has a hinge formed therein.

14. In combination, a first corrugated pipe, a second corrugated pipe, and a corrugated pipe saddle gasket, said first corrugated pipe having an external surface and said second corrugated pipe having a bell, and said corrugated pipe saddle gasket comprising
a leading member,
a primary sealing member, and
an arm member, said gasket having a contoured surface extending along at least a portion of the bottom of said primary sealing member and said arm member, said primary sealing member being intermediate said leading member and said arm member, said leading member being of a first length, said primary sealing member being of a second length, said arm member being of a third length, said third length being greater than the sum of said first and second lengths, said leading member having a leading face, said leading face having a top edge and a bottom edge, said leading member having a bottom surface and a channel, said channel having a first sidewall, a second sidewall, and a bottom surface, said first sidewall being adjacent said leading face, said channel having a width that extends from said first sidewall to said second sidewall, said first sidewall having a height that extends from said top edge of said leading face to said channel, said width of said channel being greater than said height of said first sidewall, at least a portion of said arm member having a durometer different from the durometer of said primary sealing member.

* * * * *